US012280343B2

(12) United States Patent
Jaillet, Jr.

(10) Patent No.: US 12,280,343 B2
(45) Date of Patent: Apr. 22, 2025

(54) BEVERAGE MIXING BLOCK

(71) Applicant: Donald J Jaillet, Jr., Sutton, MA (US)

(72) Inventor: Donald J Jaillet, Jr., Sutton, MA (US)

(*) Notice: Subject to any disclaimer, the term of this patent is extended or adjusted under 35 U.S.C. 154(b) by 517 days.

(21) Appl. No.: 17/102,434

(22) Filed: Nov. 23, 2020

(65) Prior Publication Data

US 2021/0220782 A1 Jul. 22, 2021

Related U.S. Application Data

(60) Provisional application No. 62/939,596, filed on Nov. 23, 2019.

(51) Int. Cl.

| | |
|---|---|
| ***B01F 5/04*** | (2006.01) |
| ***B01F 3/08*** | (2006.01) |
| ***B01F 23/451*** | (2022.01) |
| ***B01F 25/314*** | (2022.01) |
| ***B67D 1/00*** | (2006.01) |
| *B01F 23/40* | (2022.01) |
| *B01F 101/14* | (2022.01) |

(52) U.S. Cl.

CPC .......... *B01F 25/314* (2022.01); *B01F 23/451* (2022.01); *B67D 1/0052* (2013.01); *B01F 23/483* (2022.01); *B01F 2101/14* (2022.01); *B01F 2215/0422* (2013.01); *B01F 2215/0431* (2013.01)

(58) Field of Classification Search

CPC .. B67D 1/0015; B67D 1/0017; B67D 1/0021; B67D 1/0043; B67D 1/0046; B67D 1/0052; B67D 1/0059; B05C 17/00553; B05C 17/00556; B01F 2101/14; B01F 35/83; B01F 23/236; B01F 23/2363; B01F 25/314; G05D 11/03

See application file for complete search history.

(56) References Cited

U.S. PATENT DOCUMENTS

| | | | | |
|---|---|---|---|---|
| 4,440,318 A * | 4/1984 | Berger | B67D 1/0074 222/397 |
| 6,173,862 B1 * | 1/2001 | Buca | B67D 1/0043 239/433 |
| 7,311,225 B2 * | 12/2007 | Newton | B67D 1/003 222/145.5 |
| 2007/0204930 A1 | 9/2007 | Phallen et al. | |

* cited by examiner

*Primary Examiner* — Elizabeth Insler

(74) *Attorney, Agent, or Firm* — BainwoodHuang

(57) ABSTRACT

A mixing block for mixing components of a beverage prior to the mixture reaching the tap, for improving the consistency of the mixed beverage as it leaves the tap. The invention is particularly effective when one of the components tends to settle out during storage. In the mixing chamber, one stream goes straight through and the other impinges from the side, to cause enhanced mixing.

22 Claims, 7 Drawing Sheets

FULLY ASSEMBLED MIXING BLOCK

Carbonated application

A) Gas cylinder
B) Beverage pump
C) Concentrated product
D) Carbonator
E) Mixing block
F) Single port dispensing valve Non-carbonated application A') Gas cylinder
B') Beverage pump
C') Concentrated product
D') Pressurized water source
E') Mixing block
F') Single port dispensing valve

BEVERAGE MIXING BLOCK

SUMMARY OF THE INVENTION

A mixing block for mixing components of a beverage prior to the mixture reaching the tap, for improving the consistency of the mixed beverage as it leaves the tap. The invention is particularly effective when one of the components tends to settle out during storage. In the mixing chamber, one stream goes straight through and the other impinges from the side, to cause enhanced mixing.

BACKGROUND OF THE INVENTION

THE PRIOR SYSTEMS The current mixed beverage market has two versions: PRE-MIX system and POST MIX system.

PRE-MIX SYSTEM In the PRE-MIX system, all of the components of the beverage are premixed in a container (Keg or BIB (Bag in box)}, and pressurized gas is used to push the mixture through conduits, to a single port dispensing valve (tap). The gas does not carbonate the mixture.

The mixture tends to settle out over time, so the composition of the mixture from the container tends to change over time, causing inconsistent beverages, over time.

POST-MIX SYSTEM In the POST MIX system, the concentrated liquid and the diluent (water or carbonated water, or just some other liquid) are stored in separate containers. Each liquid is pumped, through separate conduits, to a two-ported tap. The two liquids exit the tap separately, and are mixed after exiting the ports.

Because the concentrate doses not settle over time, this two-port system is currently giving a high degree of consistency, but the two-port tap is too expensive and customers don't like the look of it.

DETAILED DESCRIPTION OF THE DRAWINGS

DETAILED DESCRIPTION OF THE INVENTION

Figure 1:
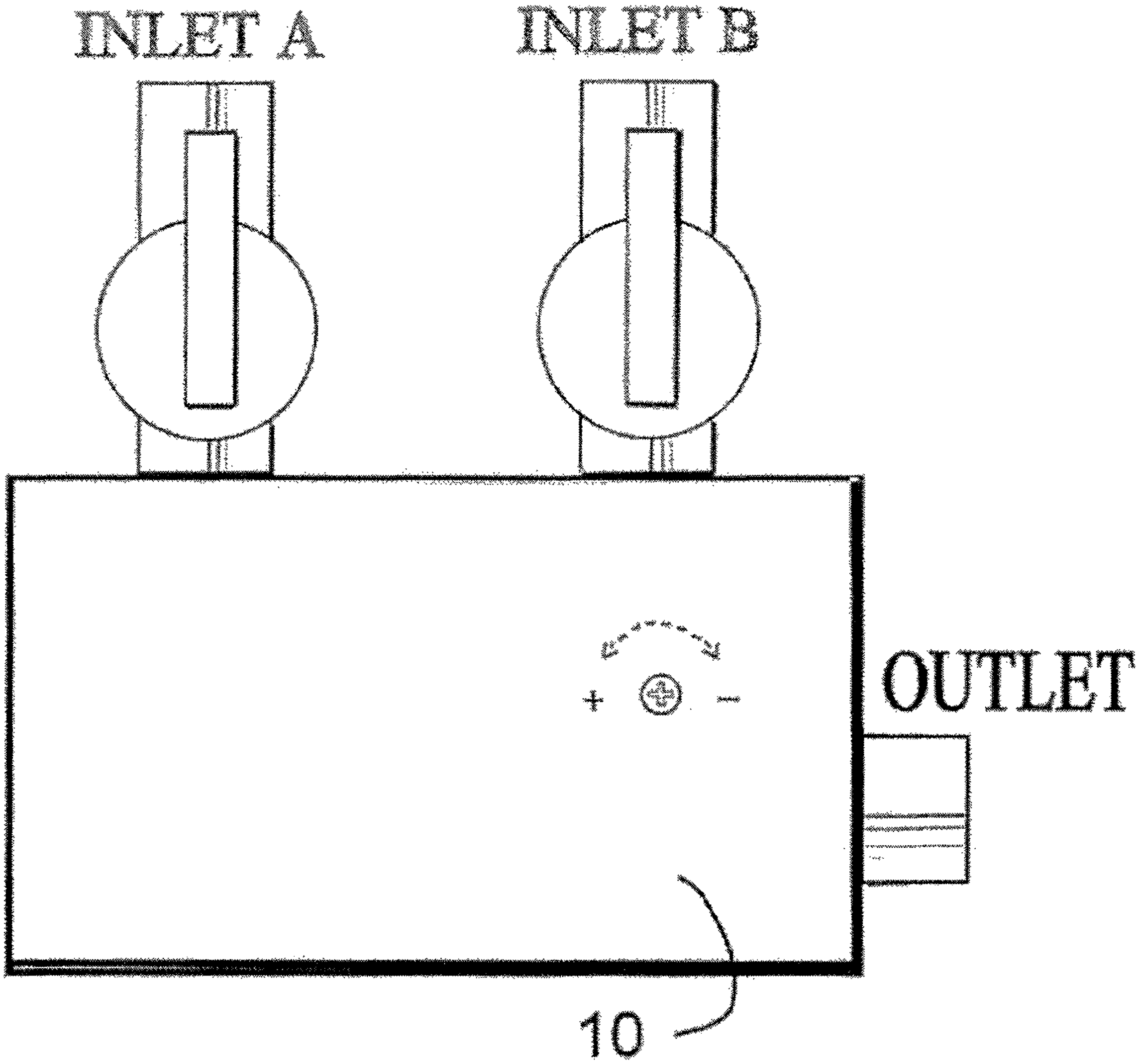
FIG. 1 is a front elevation view of the mixing block 10, embodying the principles of the present invention.
Figure 4:
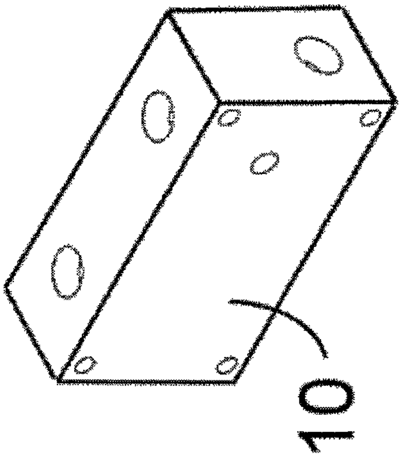
FIG. 4 is a perspective view of the mixing block 10, embodying the principles of the present invention.
Figure 5:
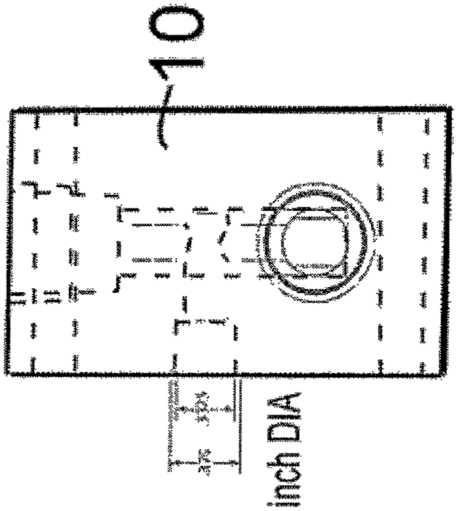
FIG. 5 is a right side elevation view of the mixing block 10, embodying the principles of the present invention.
Figure 3:
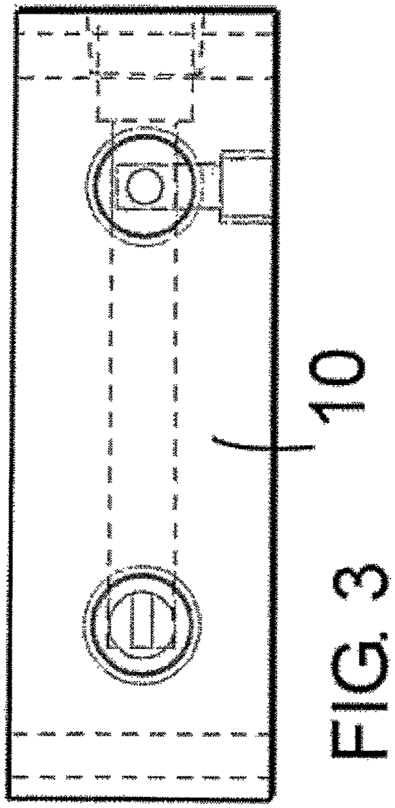
FIG. 3 is a top view of the mixing block 10, embodying the principles of the present invention.
Figure 2:
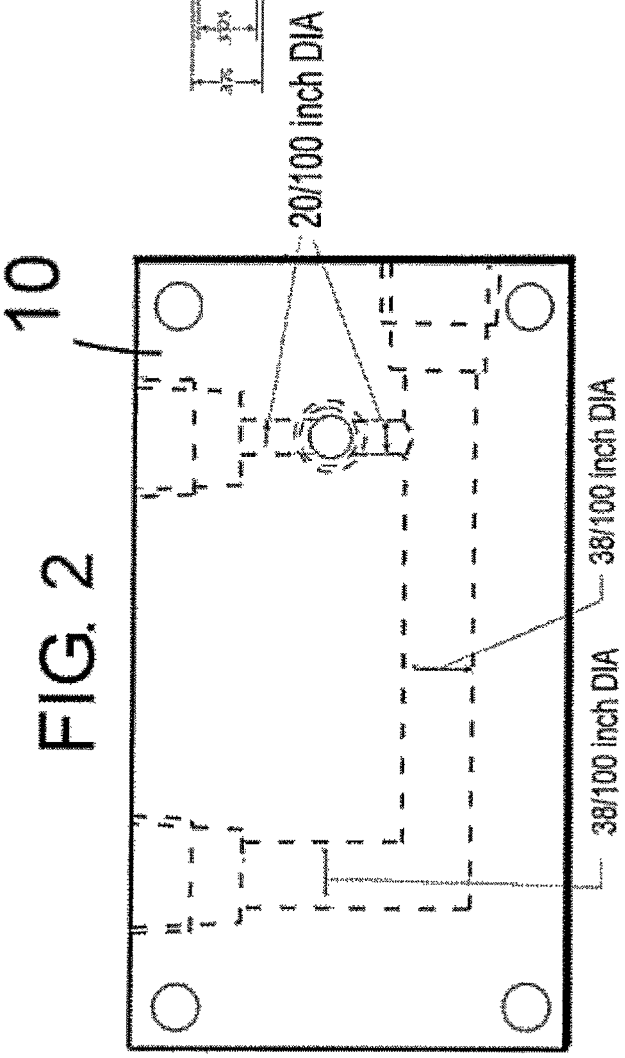
FIG. 2 is a front elevation view of the mixing block 10, embodying the principles of the present invention.
Figure 6:
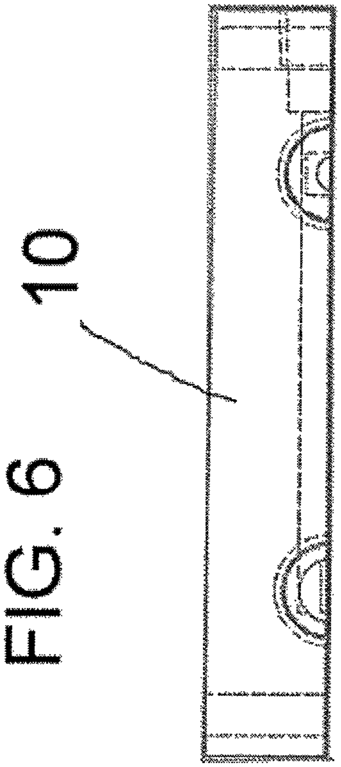
FIG. 6 is a top sectional view of the mixing block 10, embodying the principles of the present invention.
Figure 7:
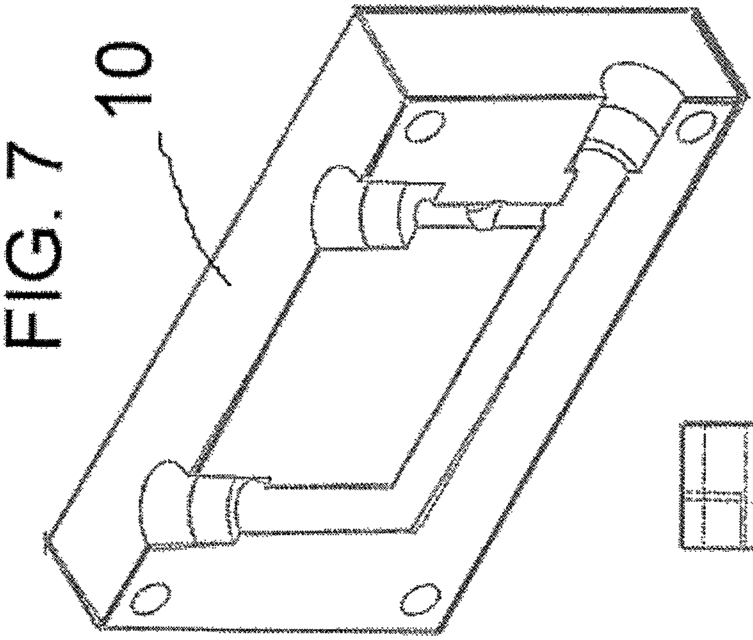
FIG. 7 is a perspective sectional view of the mixing block 10, embodying the principles of the present invention.
Figure 8:
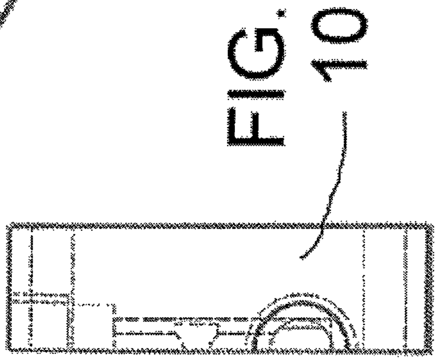
FIG. 8 is a right side elevation sectional view of the mixing block 10, embodying the principles of the present invention.
Figure 9:
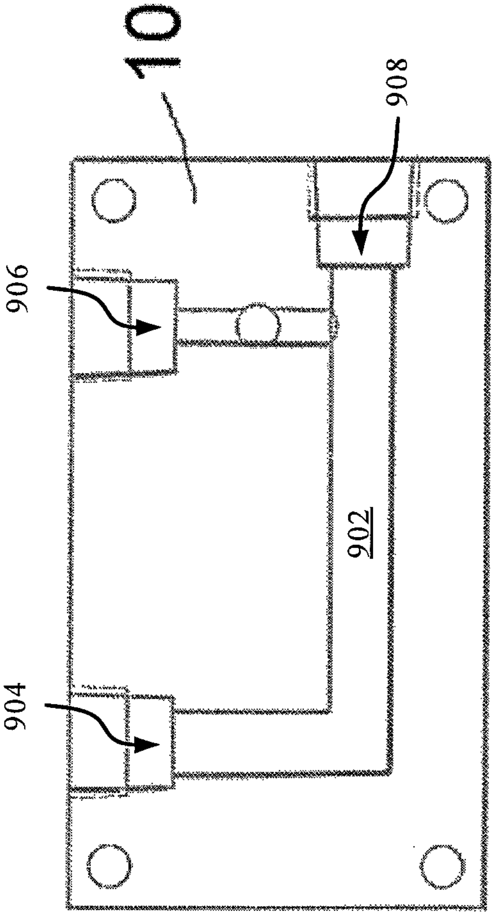
FIG. 9 is a front section view of the mixing block 10, embodying the principles of the present invention.
Figure 10:
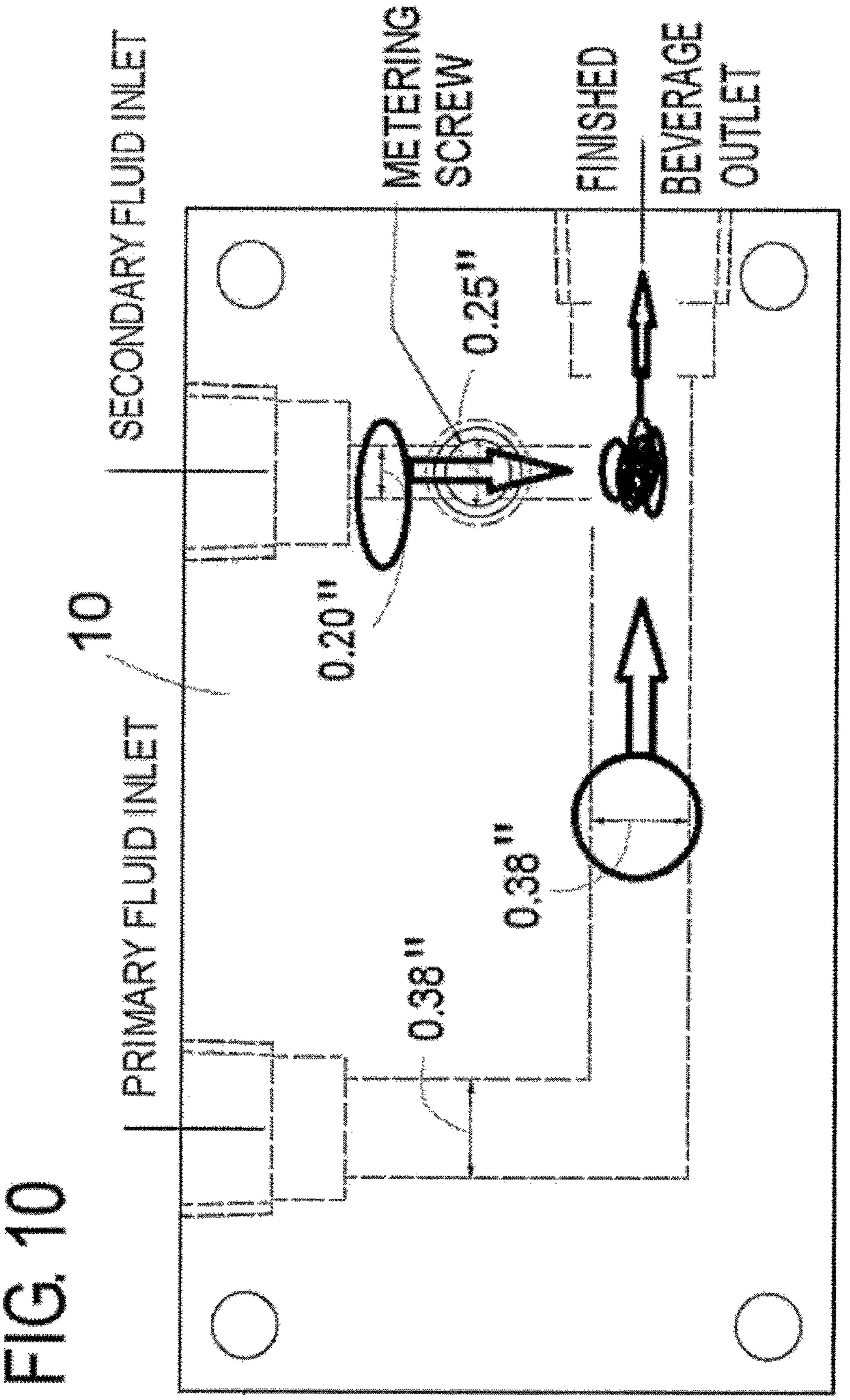
FIG. 10 is a front elevation view of a mixing block 10 embodying the principles of the present invention.
Figure 11:
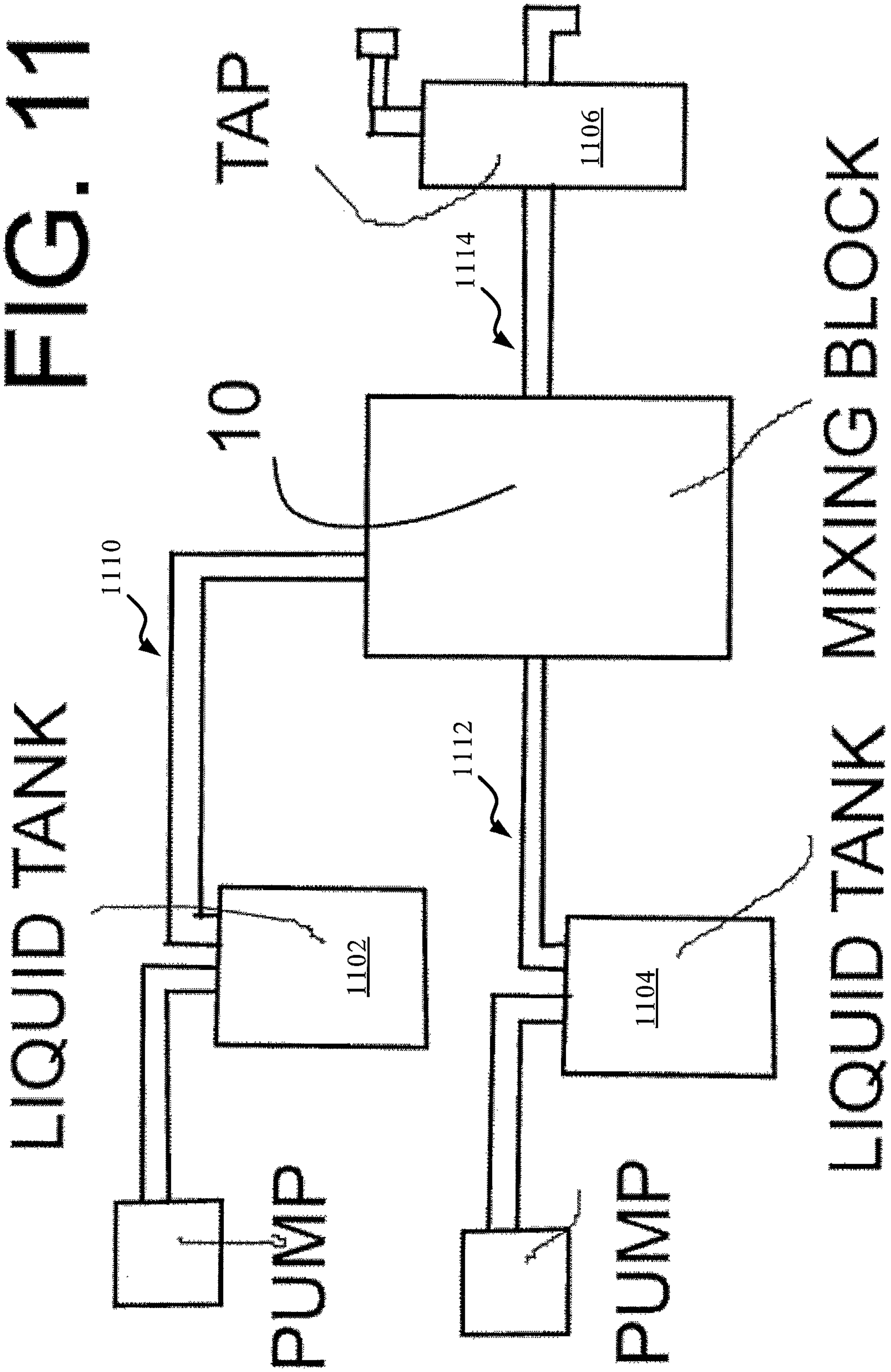
FIG. 11 is a schematic view of a beverage dispensing system employing the mixing block 10 embodying the principles of the present invention.
Figure 12:
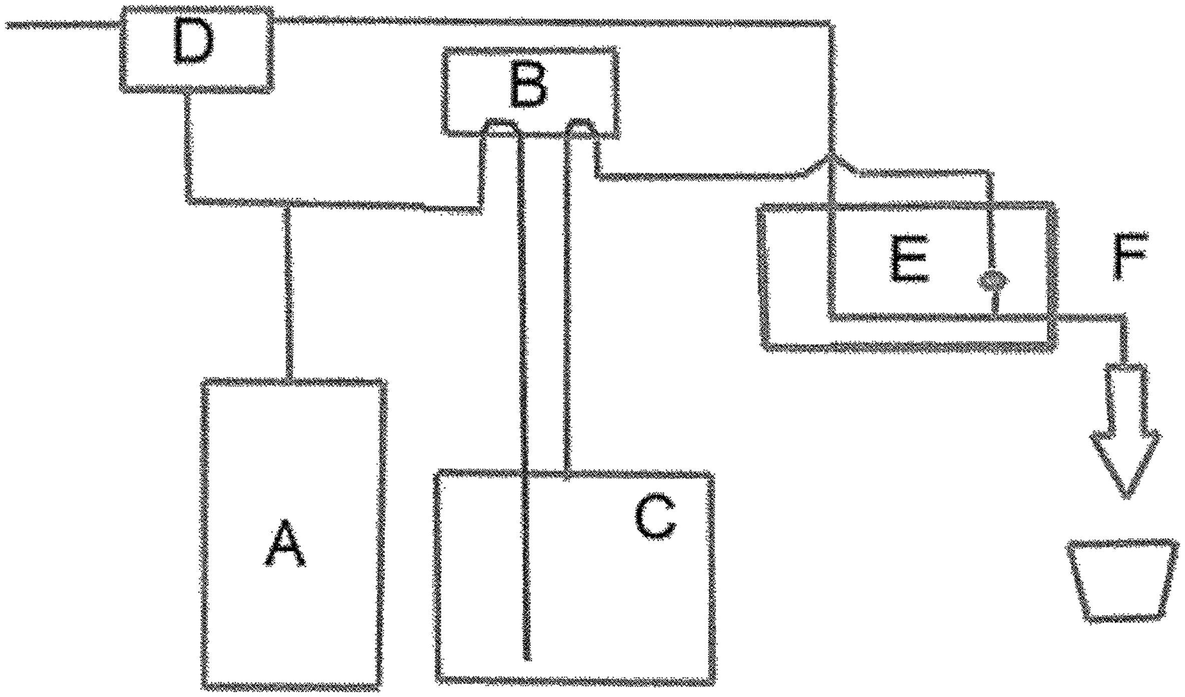
FIG. 12 is a schematic view a beverage dispensing system employing the mixing block 10 embodying the principles of the present invention.
Figure 13:
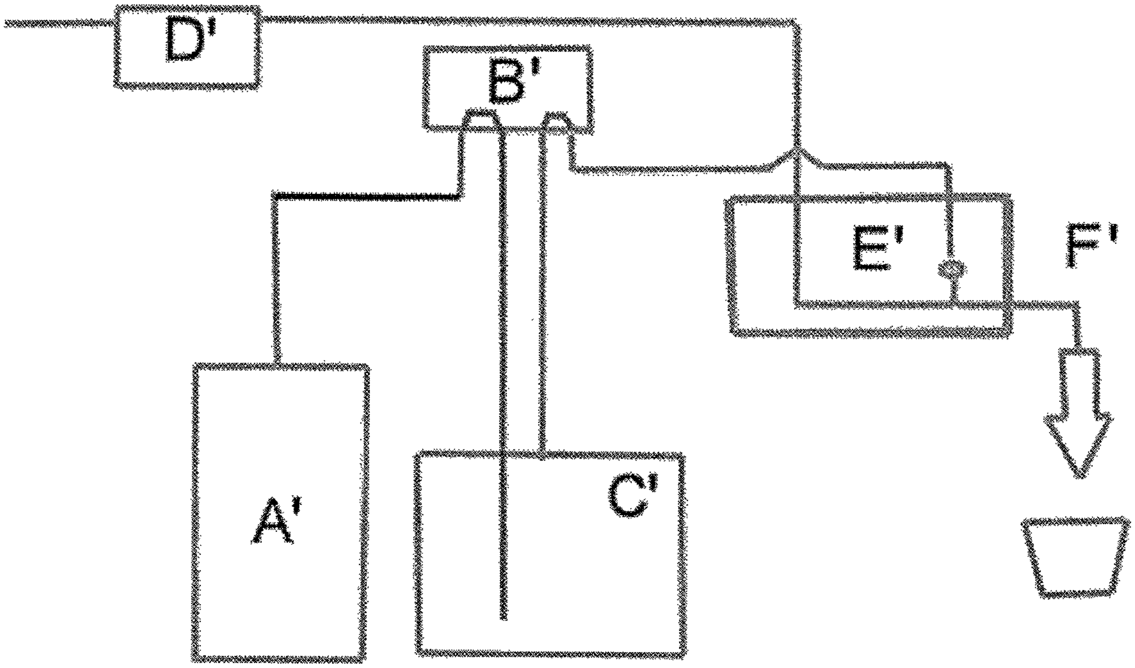
FIG. 13 is a schematic view a beverage dispensing system employing the mixing block 10 embodying the principles of the present invention.

THE MIXING BLOCK OF THE PRESENT INVENTION In this novel mixing block system, two (or more) separate streams are combined in a mixing block before they get to the tap, which can, therefore, be a single-port tap.

This design gives the same high consistency of the old POST-MIX system, but it allows you to use the standard one-port tap, which is already installed, is less expensive, and is more desirable to the customers.

INNOVATIONS The block structure is critical to maximizing the consistency of the final dispensed product. The block is designed with a larger primary product port having a larger cross-sectional area and a smaller secondary port having a larger cross-sectional area. This provides the product room to expand and mix better than if the ports were the same size. The result is a turbulence at and after mixing, the provides a uniform composition shortly after the liquid leaves exit the mixing block, and before the liquid reaches the tap.

Ideally, the primary port conduit is designed to pass straight by the secondary port, with the secondary to create a flow pattern that aids in the mixing process.

Typically a (Y or T) type fitting would have the same size ports, this would make the products "fight one another" and mix properly, essentially forming two separate streams as they pass through and out of the mixing block. If made with multiple components, if it were possible, the cost would be greater and would need to be customized to create the effectiveness our block was designed to have.

Our data, on a simulated commercial tap system, indicated that the two liquid streams are 100% mixed within three feet of the mixing block. We have seen no difference in the beverage ratio over distances between 3 ft and 100 ft away from the dispensing faucet. It seems like the distance may not matter as long as the two liquids are somewhat combined and fed together into the single port tap. The key is that once the mixture is made and has exited the mixing block, because it is under pressure and in a tube (small diameter), the mixture will stay mixed in solution. When the final mix is in a large vessel (Keg or BIB (bag in box)), as with any mixture in large volume, it will begin to separate due to weight based on volume. But when the first liquid is highly concentrated, and in a large vessel (Keg or BIB (bag in box)), it will NOT begin to separate. So the first liquid comes out of its containing in a consistent composition over a long time. Once it is diluted with the second liquid, and fed to the tap, it does not have time to settle out, and therefore the final product maintains a consistent composition.

This consistent composition will only avoid settling out in the glass into which the tap delivers the beverage, because the mixing block very quickly, thoroughly, and effectively mixes the first and second liquid as the pass out of the mixing block and toward the tap.

The quick, thorough, and effective mixing is the result of two mixing functions. The first function is that the opening of the conduit of the first liquid has a larger inner diameter than the opening of the conduit of the second liquid. This difference causes turbulence within the mixing chamber, and speeds and enhances mixing of the two liquids.

Likewise, the second liquid is injected perpendicularly into the flow path of the first liquid. This directionality causes turbulence within the mixing chamber, and speeds and enhances mixing of the two liquids. The two factors can work together and are additive, maximizing the speed and enhances of the mixing.

In a first embodiment of the invention, a liquid mixing device, comprising: a first source 1102 of a first liquid, said first liquid being at a first pressure, greater than atmospheric pressure; a second source 1104 of a second liquid, said second liquid being at a second pressure, greater than atmospheric pressure; a tap 1106, capable of controlling and delivering fluid through it to atmospheric pressure; a mixing junction (mixing block 10), comprising: a mixing chamber 902, which mixes the first liquid and the second liquid to form a first mixture of a third liquid in the mixing chamber; a first port 904, which feeds the first liquid into the mixing junction and to the mixing chamber 902, a second port 906, which feeds the second liquid into the mixing junction and to the mixing chamber 902, a third port 908, which feeds the first mixture of the third liquid in the mixing chamber 902 out of the mixing junction; a first conduit 1110 that feeds the first liquid from the first source 1102 to the first port 904 of the mixing junction; a second conduit 1112 that feeds the second liquid from the second source 1104 to the second port 906 of the mixing junction; and a third conduit 1114 that feeds the liquid from the third port 908 of the mixing junction to the tap 1106.

In another embodiment of the invention, a 3. A liquid mixing device, as recited in Claim 1, in which the second liquid is a beverage.

In another embodiment of the invention, a 4 A liquid mixing device, as recited in Claim 1, in which the third liquid is a beverage.

One and Two Relative Sizes—Round

In another embodiment of the invention, a 5. A liquid mixing device, as recited in Claim 1, in which the first port is cylindrical and has a first inner diameter and the second port is cylindrical and has a second inner diameter, and the first inner diameter is greater than the second inner diameter.

In another embodiment of the invention, a 6. A liquid mixing device, as recited in Claim 5, wherein the first inner diameter is 0.38 inches and the second inner diameter is 0.20 inches.

In another embodiment of the invention, a 7. A liquid mixing device, as recited in Claim 5, wherein the first inner diameter is 0.38+/−0.5 inches and the second inner diameter is 0.20+/−0.5 inches.

In another embodiment of the invention, a 8. A liquid mixing device, as recited in Claim 5, wherein the first inner diameter 1.9+/−0.5 times greater than the second inner diameter.

One and Two Relative Sizes—not Round

In another embodiment of the invention, a 9. A liquid mixing device, as recited in Claim 1, in which the first port has a first inner cross-sectional area and the second port has a second inner cross-sectional area, and the first inner cross-sectional area is greater than the second inner cross-sectional area.

In another embodiment of the invention, a 10. A liquid mixing device, as recited in Claim 9, wherein the first cross-sectional area is 0.113 square inches and the second cross-sectional area is 0.03 square inches.

In another embodiment of the invention, a 11. A liquid mixing device, as recited in Claim 9, wherein the first cross-sectional area is 0.113+/−0.5 inches and the second cross-sectional area is 0.03+/−0.5 inches.

In another embodiment of the invention, a 12. A liquid mixing device, as recited in Claim 9, wherein the first cross-sectional area is 4+/−0.5 times greater than the second cross-sectional area.

First and Third Opposite

In another embodiment of the invention, a 13. A liquid mixing device, as recited in Claim 1, wherein the first port and the third port are directly opposed in the mixing chamber so that the first port directs the first liquid directly through the mixing chamber to the third port along a line of flow.

In another embodiment of the invention, a 14. A liquid mixing device, as recited in Claim 1, wherein the first port and the third port are opposed in the mixing chamber, with the midpoint of the third port less that 20 degrees off on the axis of the first port, so that the first port directs the first liquid through the mixing chamber to the third port along a line of flow.

Second Perpendicular

In another embodiment of the invention, a 15. A liquid mixing device, as recited in Claim 14, wherein the second port directs the second liquid perpendicular to the line of flow of the first liquid through the mixing chamber.

In another embodiment of the invention, a 16. A liquid mixing device, as recited in Claim 14, wherein the second port directs the second liquid perpendicular to the line of flow of the first liquid through the mixing chamber, to the third port.

In another embodiment of the invention, a 17. A liquid mixing device, as recited in Claim 14, wherein the second port directs the second liquid at 90 degrees to the line of flow of the first liquid through the mixing chamber, to the third port.

In another embodiment of the invention, a 18. A liquid mixing device, as recited in Claim 13, wherein the second port directs the second liquid at 90+/−20 degrees to the line of flow of the first liquid through the mixing chamber, to the third port.

First and Third Opposite and the Second is Perpendicular

In another embodiment of the invention, a 19. A liquid mixing device, as recited in Claim 1, in which the first port and the second port are directly opposed in the mixing chamber so that the first port directs the first liquid directly through the mixing chamber to the third port, and the second port directs the second liquid toward and perpendicular to the line of flow.

In another embodiment of the invention, a liquid mixing device, comprising: a first source of a first liquid, said first liquid being at a first pressure, greater than atmospheric pressure; a second source of a second liquid, said second liquid being at a second pressure, greater than atmospheric pressure; a tap, capable of controlling and delivering fluid through it to atmospheric pressure; a mixing junction, comprising; a mixing chamber, which mixes the first liquid and the second liquid to form a first mixture of a third liquid in the mixing chamber; a first port, which feeds the first liquid into the mixing junction and to the mixing chamber, a second port, which feeds the second liquid into the mixing junction and to the mixing chamber, a third port, which feeds the first mixture of the third liquid in the mixing chamber out of the mixing junction; any liquid in the mixing chamber the second liquid to the tap, wherein, a first conduit that feeds the first liquid from the first source to the first port of the mixing junction; a second conduit that feeds the second liquid from the second source to the second port of the mixing junction; and a third conduit that feeds the liquid from the third port of the mixing junction to the tap, wherein;

the third liquid is a beverage, the first port has a first inner cross-sectional area and the second port has a second inner cross-sectional area, and the first inner cross-sectional area is greater than the second inner cross-sectional area; the first port and the third port are directly opposed in the mixing chamber so that the first port directs the first liquid directly through the mixing chamber to the third port along a line of flow; and the second port directs the second liquid perpendicular to the line of flow of the first liquid through the mixing chamber.

The invention claimed is:

1. A liquid mixing device, comprising:
- a first source of a first liquid, said first liquid being at a first pressure, greater than atmospheric pressure;
- a second source of a second liquid, said second liquid being at a second pressure, greater than atmospheric pressure;
- a tap, capable of controlling and delivering fluid through it to atmospheric pressure;
- a mixing junction, comprising:
  - a mixing chamber, in which the first liquid and the second liquid mix to form a first mixture of a third liquid in the mixing chamber,
  - a first port, which feeds the first liquid into the mixing junction and to the mixing chamber,
  - a second port, which feeds the second liquid into the mixing junction and to the mixing chamber, and
  - a third port, which feeds the first mixture of the third liquid in the mixing chamber out of the mixing junction;
- wherein the liquid mixing device further comprises:
  - a first conduit that feeds the first liquid from the first source to the first port of the mixing junction;
  - a second conduit that feeds the second liquid from the second source to the second port of the mixing junction; and
  - a third conduit that feeds the liquid from the third port of the mixing junction to the tap;
- wherein the first port has a first inner cross-sectional area and the second port has a second inner cross-sectional area, and the first inner cross-sectional area is greater than the second inner cross-sectional area;
- wherein the liquid mixing device further comprises:
  - a metering screw that couples with the mixing junction, the metering screw being constructed and arranged to modify the second inner cross-sectional area;
- wherein the mixing chamber has the first inner cross-sectional area; and
- wherein the first port is constructed and arranged to engage with the first conduit, the first port maintaining the first inner cross-sectional area from the first conduit to the mixing chamber when the first port engages with the first conduit.

2. The liquid mixing device, as recited in claim 1, in which the first liquid is a beverage.

3. The liquid mixing device, as recited in claim 1, in which the second liquid is a beverage.

4. The liquid mixing device, as recited in claim 1, in which the third liquid is a beverage.

5. The liquid mixing device, as recited in claim 1, in which the first port is cylindrical and has a first inner diameter and the second port is cylindrical and has a second inner diameter, and the first inner diameter is greater than the second inner diameter.

6. The liquid mixing device, as recited in claim 5, wherein the first inner diameter is 0.38+/−0.5 inches and the second inner diameter is 0.20+/−0.5 inches.

7. The liquid mixing device, as recited in claim 1, wherein the first cross-sectional area is 0.113 square inches and the second cross-sectional area is 0.03 square inches.

8. The liquid mixing device, as recited in claim 1, wherein the first cross-sectional area is 0.113+/−0.5 inches and the second cross-sectional area is 0.03+/−0.5 inches.

9. The liquid mixing device, as recited in claim 1, wherein the first port and the third port are directly opposed in the mixing chamber so that the first port directs the first liquid directly through the mixing chamber to the third port along a line of flow.

10. The liquid mixing device, as recited in claim 9, wherein the second port directs the second liquid at 90+/−20 degrees to the line of flow of the first liquid through the mixing chamber, to the third port.

11. The liquid mixing device, as recited in claim 1, wherein the first port and the third port are opposed in the mixing chamber, with a midpoint of the third port less than 20 degrees off on the axis of the first port, so that the first port directs the first liquid through the mixing chamber to the third port along a line of flow.

12. The liquid mixing device, as recited in claim 11, wherein the second port directs the second liquid perpendicular to the line of flow of the first liquid through the mixing chamber.

13. The liquid mixing device, as recited in claim 11, wherein the second port directs the second liquid perpendicular to the line of flow of the first liquid through the mixing chamber, to the third port.

14. The liquid mixing device, as recited in claim 11, wherein the second port directs the second liquid at 90 degrees to the line of flow of the first liquid through the mixing chamber, to the third port.

15. The liquid mixing device, as recited in claim 1, in which the first port and the second port are directly opposed in the mixing chamber so that the first port directs the first liquid directly through the mixing chamber to the third port, and the second port directs the second liquid toward and perpendicular to the line of flow.

16. A liquid mixing device, comprising:
- a first source of a first liquid, said first liquid being at a first pressure, greater than atmospheric pressure;
- a second source of a second liquid, said second liquid being at a second pressure, greater than atmospheric pressure;
- a tap, capable of controlling and delivering fluid through it to atmospheric pressure;
- a mixing junction, comprising:
  - a mixing chamber, in which the first liquid and the second liquid mix to form a first mixture of a third liquid in the mixing chamber,
  - a first port, which feeds the first liquid into the mixing junction and to the mixing chamber,
  - a second port, which feeds the second liquid into the mixing junction and to the mixing chamber,
  - a third port, which feeds the first mixture of the third liquid in the mixing chamber out of the mixing junction;
- wherein the liquid mixing device further comprises:
  - a first conduit that feeds the first liquid from the first source to the first port of the mixing junction;
  - a second conduit that feeds the second liquid from the second source to the second port of the mixing junction; and
  - a third conduit that feeds the liquid from the third port of the mixing junction to the tap, and
- wherein:

the third liquid is a beverage;

the first port has a first inner cross-sectional area and the second port has a second inner cross-sectional area, and the first inner cross-sectional area is greater than the second inner cross-sectional area;

the first port and the third port are directly opposed in the mixing chamber so that the first port directs the first liquid directly through the mixing chamber to the third port along a line of flow; and the second port directs the second liquid perpendicular to the line of flow of the first liquid through the mixing chamber;

wherein the liquid mixing device further comprises:

a metering screw that couples with the mixing junction, the metering screw being constructed and arranged to modify the second inner cross-sectional area;

wherein the mixing chamber has the first inner cross-sectional area; and wherein the first port is constructed and arranged to engage with the first conduit, the first port maintaining the first inner cross-sectional area from the first conduit to the mixing chamber when the first port engages with the first conduit.

17. A liquid mixing assembly, comprising:

a mixing junction, defining:

a mixing chamber in which a first liquid and a second liquid mix to form a mixture, a first port through which the first liquid feeds into the mixing chamber, a second port through which the second liquid feeds into the mixing chamber, and a third port through which the mixture exits the mixing chamber and out of the mixing junction;

wherein the first port has a first inner cross-sectional area and the second port has a second inner cross-sectional area, the first inner cross-sectional area being greater than the second inner cross-sectional area;

wherein the liquid mixing assembly further comprises:

a metering screw that couples with the mixing junction, the metering screw being constructed and arranged to modify the second inner cross-sectional area;

wherein the mixing chamber has the first inner cross-sectional area; and wherein the first port is constructed and arranged to engage with a fluid conduit which provides the first liquid, the first port maintaining the first inner cross-sectional area from the fluid conduit to the mixing chamber when the first port engages with the fluid conduit.

18. The liquid mixing assembly, as recited in claim 17, wherein the mixing chamber has a third inner cross-sectional area at a position in which the second liquid feeds into the mixing chamber, the third inner cross-sectional area matching the first inner cross-sectional area of the first port.

19. The liquid mixing assembly, as recited in claim 17, wherein the metering screw includes a threaded screw, the threaded screw having an end portion constructed and arranged to be inserted into the second port, the end portion spanning a width less than a width of the first port.

20. The liquid mixing assembly of claim 17, further comprising:

a gas infuser coupled with the first port of the mixing junction, the gas infuser being constructed and arranged to infuse gas into a liquid to produce a gas-infused liquid as the first liquid.

21. The liquid mixing assembly of claim 20, wherein the gas infuser includes a carbonator constructed and arranged to carbonate the first liquid.

22. The liquid mixing assembly of claim 17, wherein the first port is provided as a bore that maintains the first inner cross-sectional area from the fluid conduit to the mixing chamber when the fluid conduit engages with the first port.

* * * * *